United States Patent
Chaudhuri et al.

(10) Patent No.: US 9,179,479 B2
(45) Date of Patent: Nov. 3, 2015

(54) METHOD AND SYSTEM FOR ADMISSION CONTROL IN A BROADBAND WIRELESS NETWORK

(71) Applicants: Saptarshi Chaudhuri, Bangalore (IN); Irfan Baig, Bangalore (IN)

(72) Inventors: Saptarshi Chaudhuri, Bangalore (IN); Irfan Baig, Bangalore (IN)

(73) Assignee: Wipro Limited, Bangalore (IN)

( * ) Notice: Subject to any disclaimer, the term of this patent is extended or adjusted under 35 U.S.C. 154(b) by 209 days.

(21) Appl. No.: 13/859,865

(22) Filed: Apr. 10, 2013

(65) Prior Publication Data

US 2014/0226471 A1    Aug. 14, 2014

(30) Foreign Application Priority Data

Feb. 11, 2013 (IN) .............................. 565/CHE/2013

(51) Int. Cl.
*H04W 74/08* (2009.01)
*H04W 76/02* (2009.01)
*H04W 74/00* (2009.01)

(52) U.S. Cl.
CPC .......... *H04W 74/0833* (2013.01); *H04W 76/02* (2013.01); *H04W 74/008* (2013.01); *H04W 76/027* (2013.01)

(58) Field of Classification Search
None
See application file for complete search history.

(56) References Cited

U.S. PATENT DOCUMENTS

| | | | |
|---|---|---|---|
| 6,490,259 B1* | 12/2002 | Agrawal et al. | 370/331 |
| 7,092,428 B2* | 8/2006 | Chen et al. | 375/132 |
| 7,613,473 B2 | 11/2009 | Yi et al. | |
| 8,495,648 B1* | 7/2013 | Brandwine et al. | 718/104 |
| 8,718,659 B2* | 5/2014 | Chen | 455/450 |
| 2005/0047347 A1* | 3/2005 | Lee et al. | 370/241 |
| 2009/0042582 A1 | 2/2009 | Wang et al. | |
| 2010/0195522 A1* | 8/2010 | Lee et al. | 370/252 |
| 2010/0296472 A1 | 11/2010 | Lee et al. | |
| 2010/0302934 A1 | 12/2010 | Baker et al. | |
| 2013/0210444 A1* | 8/2013 | Morrin | 455/445 |
| 2014/0023032 A1* | 1/2014 | Kim et al. | 370/329 |
| 2014/0226472 A1 | 8/2014 | Chaudhuri et al. | |

FOREIGN PATENT DOCUMENTS

| | | |
|---|---|---|
| WO | WO 01/28126 A1 | 4/2001 |
| WO | WO 2008/115451 A1 | 9/2008 |
| WO | WO 2010/002301 A1 | 1/2010 |
| WO | WO 2010/104977 A1 | 9/2010 |

OTHER PUBLICATIONS

Non-Final Office Action mailed on Jan. 5, 2015 in U.S. Appl. No. 13/859,895.

* cited by examiner

*Primary Examiner* — Fang Ng
(74) *Attorney, Agent, or Firm* — Finnegan, Henderson, Farabow, Garrett & Dunner, LLP

(57) ABSTRACT

A method, system, and non-transitory computer-readable storage medium for providing admission control in a wireless network are provided. The method may include receiving a RACH-Preamble from a mobile device and determining whether a first set of requirements is satisfied for the received RACH-Preamble. The method may further include transmitting a first response to the mobile device when the first set of requirements is satisfied and receiving a RRC connection request from the mobile device after transmitting the first response. The method may further include determining an establishment cause of the RRC connection request and determining whether a second set of requirements corresponding to the establishment cause are satisfied. The method may further include rejecting the RRC connection request when the second set of requirements is not satisfied.

19 Claims, 6 Drawing Sheets

METHOD AND SYSTEM FOR ADMISSION CONTROL IN A BROADBAND WIRELESS NETWORK

CROSS-REFERENCE TO RELATED PATENT APPLICATION

The present application claims priority under 35 U.S.C. §119 to Indian Patent Application No. 565/CHE/2013, filed Feb. 11, 2013, and entitled "METHOD AND SYSTEM FOR ADMISSION CONTROL IN A BROADBAND WIRELESS NETWORK." The aforementioned application is incorporated herein by reference in its entirety.

TECHNICAL FIELD

The disclosure generally relates to wireless networks, and more particularly to admission control in broadband wireless networks.

BACKGROUND

Mobile devices have moved from simple voice communication to performing functions traditionally performed by larger devices such as laptops and desktop computers. Such functions include streaming multimedia content, enabling high definition online gaming, and the like. These functions have become an integral part of our daily lives, but each of these and other functions enabled by mobile devices multiplies the bandwidth required for each user. Therefore, wireless network designs have built-in intelligence to determine how, when, and whether to grant access to a given user or mobile device to connect with the network and begin communication. This intelligence is sometimes referred to as call admission control.

An example of a wireless broadband network which has such call admission control is Long-Term Evolution (LTE). LTE is an end-to-end broadband IP network that aims to provide high sector capacity, scalability, improved end-user throughputs, and reduced user plane latency, bringing significantly improved user experience with full mobility. However, the capacity of the LTE network is limited. Accordingly, mobile operators face a delicate balancing act in trying to manage the high speed data traffic desired by its users, and maintaining the subscriber's quality of experience by providing a selective session call admission control mechanism.

As per 3rd Generation Partnership Project (3GPP) standard [http://www.3gpp.org/ftp/Specs/archive/23_series/23.401/23401-8g0.zip], call admission control from the LTE network infrastructure point of view can be broadly and generally categorized as including the following three stages:
1. Initial random access admission control at the base station or evolved NodeB (eNB);
2. Mobile device or user equipment (UE) signaling session admission control at a mobility management entity (MME); and
3. Traffic session admission control at the eNB.

Initial random access admission control is the first level of admission control where the base station or evolved NodeB (eNB) decides whether to initiate a communication path with a mobile device. Once this initial random access admission control is complete, the mobile devices can send the next set of signaling messages to the MME via the eNB, which performs the second stage UE signaling session admission control. Once the MME accepts UE signaling session admission control, then the eNB executes the traffic session admission control and finally decides whether to admit the UE to send and receive traffic.

An ineffectual traffic session grant during the initial random access admission control stage may lead to substantial signaling load processing for the second and third stages of the call admission control. This may result in bad QoS experienced by end-users and decrease the overall network performance by overwhelming the base station or eNB with UEs that cannot be admitted.

Accordingly, there exists a need for techniques for an improved initial random access admission control in wireless broadband networks such as LTE.

SUMMARY

According to an exemplary embodiment, a method of implementing admission control in a wireless network is provided. The method may include receiving a RACH-Preamble from a mobile device and determining whether a first set of requirements is satisfied for the received RACH-Preamble. The method may further include transmitting a first response to the mobile device when the first set of requirements is satisfied and receiving a RRC connection request from the mobile device after transmitting the first response. The method may further include determining an establishment cause of the RRC connection request and determining whether a second set of requirements corresponding to the establishment cause are satisfied. The method may further include rejecting the RRC connection request when the second set of requirements is not satisfied.

According to another exemplary embodiment, a non-transitory computer-readable storage medium is provided that stores instructions which when executed by a processor enable the processor to execute a method of implementing admission control in a wireless network. The method may include receiving a RACH-Preamble from a mobile device and determining whether a first set of requirements is satisfied for the received RACH-Preamble. The method may further include transmitting a first response to the mobile device when the first set of requirements is satisfied and receiving a RRC connection request from the mobile device after transmitting the first response. The method may further include determining an establishment cause of the RRC connection request and determining whether a second set of requirements corresponding to the establishment cause are satisfied. The method may further include rejecting the RRC connection request when the second set of requirements is not satisfied.

According to another exemplary embodiment, a system for implementing admission control in a wireless network is provided. The system may include a hardware processor and a memory storing instructions for execution by the hardware processor. The hardware processor may be configured by the instructions to receive a RACH-Preamble from a mobile device and determine whether a first set of requirements is satisfied for the received RACH-Preamble. The hardware processor may be further configured to transmit a first response to the mobile device when the first set of requirements is satisfied. The hardware processor may be further configured to receive a RRC connection request from the mobile device after transmitting the first response and determine an establishment cause of the RRC connection request. The hardware processor may be further configured to determine whether a second set of requirements corresponding to the establishment cause is satisfied and reject the RRC connection request when the second set of requirements is not satisfied.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Exemplary embodiments of the present disclosure will be described with reference to the accompanying drawings. Wherever possible, the same reference numbers will be used throughout the drawings to refer to the same or like parts. While exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

Figure 1:
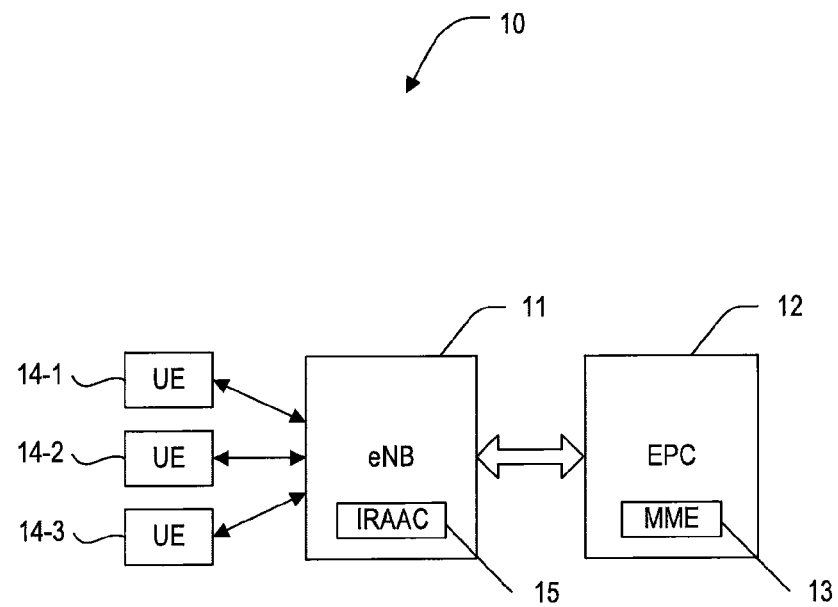
FIG. 1 illustrates an exemplary network architecture for a broadband wireless network.

An exemplary high level network 10 depicting a broadband wireless network architecture is illustrated in FIG. 1. For purposes of illustration, the network 10 corresponds to an LTE network. However, the depicted LTE network is merely an exemplary network, and thus it will be understood that the teachings of the disclosure contemplate other broadband wireless networks such as WiMax, High Speed Packet Access (3GPP's HSPA), etc.

In FIG. 1, one or more of UE 14-1, 14-2, and 14-3 (hereinafter referred to as UE 14) may communicate wirelessly with an eNB 11 that is an LTE base station. An example of a UE may be a cell phone, PDA, tablet computer, etc. The eNB 11 may communicate with an evolved packet core (EPC) 12 that may include a Mobility Management Entity (MME) 13. The functionalities of eNB 11 may include Radio Resource Management (RRM), header compression and encryption of user data stream, packet scheduling and transmission, physical layer processing, etc. MME 13 may be responsible for EPS (Evolved Packet System) Session Management (ESM), EPS Mobility Management (EMM), EPS Connection Management (ECM), Ciphering and Integrity Protection, Inter core network signaling, SAE (System Architecture Evolution) bearer control, Handover, etc. EPC 12 may also include, among other things, a serving gateway (SGW) (not shown) and packet-data network gateway (PDN GW) (not shown). The combined functionalities may include SGW and PDN GW include Lawful Interception, Packet routing and forwarding, Transport Level packet marking in the uplink and the downlink, Packet filtering, Mobile IP, Policy enforcement, etc.

To provide an improved initial random access admission control in eNB 11, an exemplary Initial Random Access Admission Control module (IRAAC) 15 may be provided in eNB 11. While FIG. 1 illustrates that IRAAC 15 may be provided in eNB 11, IRAAC 15 may be provided separately from eNB 11. An exemplary implementation of the IRAAC 15 is illustrated in FIG. 2 as IRAAC 210.

Figure 2:
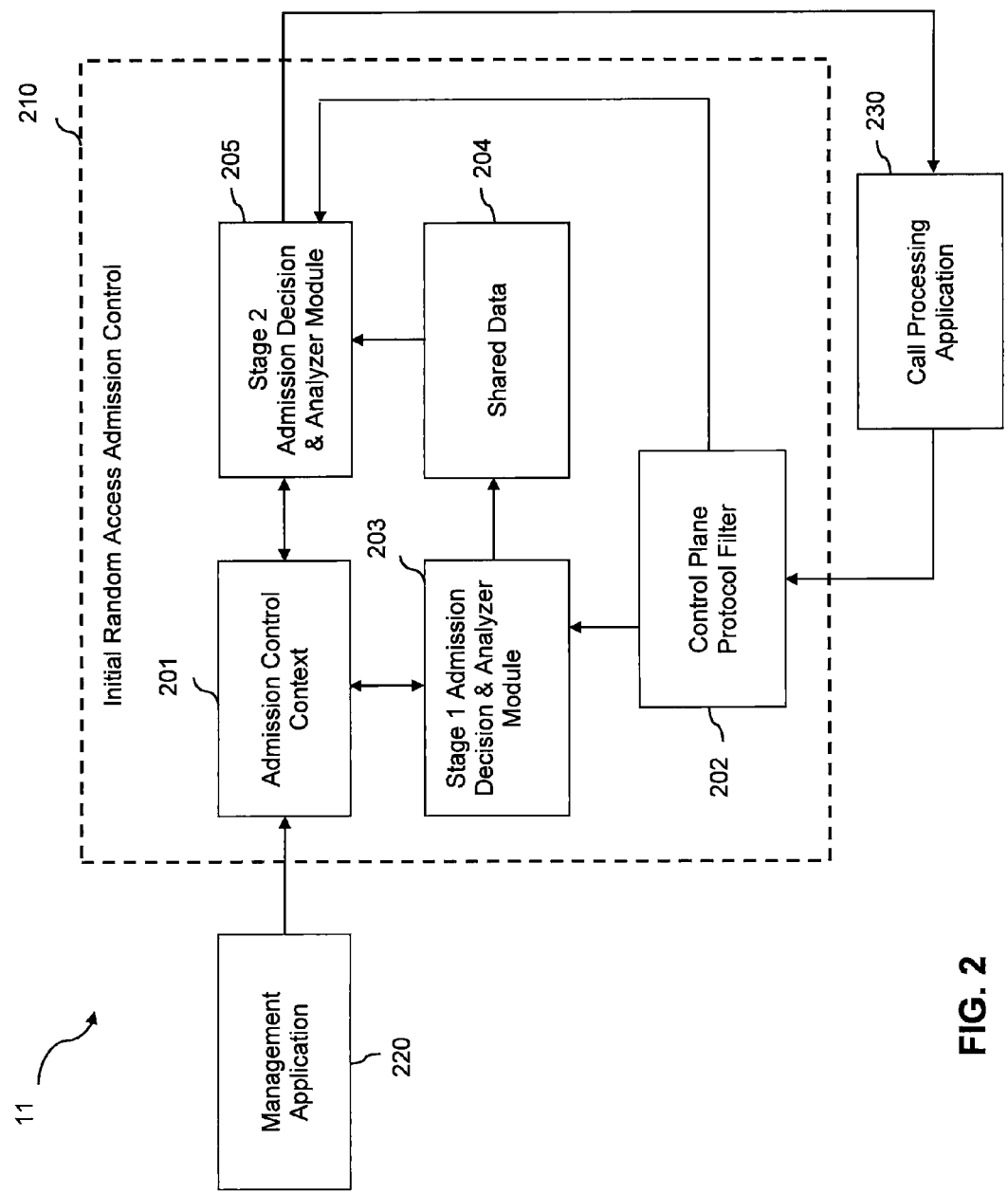
FIG. 2 illustrates an exemplary component in a base station that performs initial random access admission control.
Figure 3A:
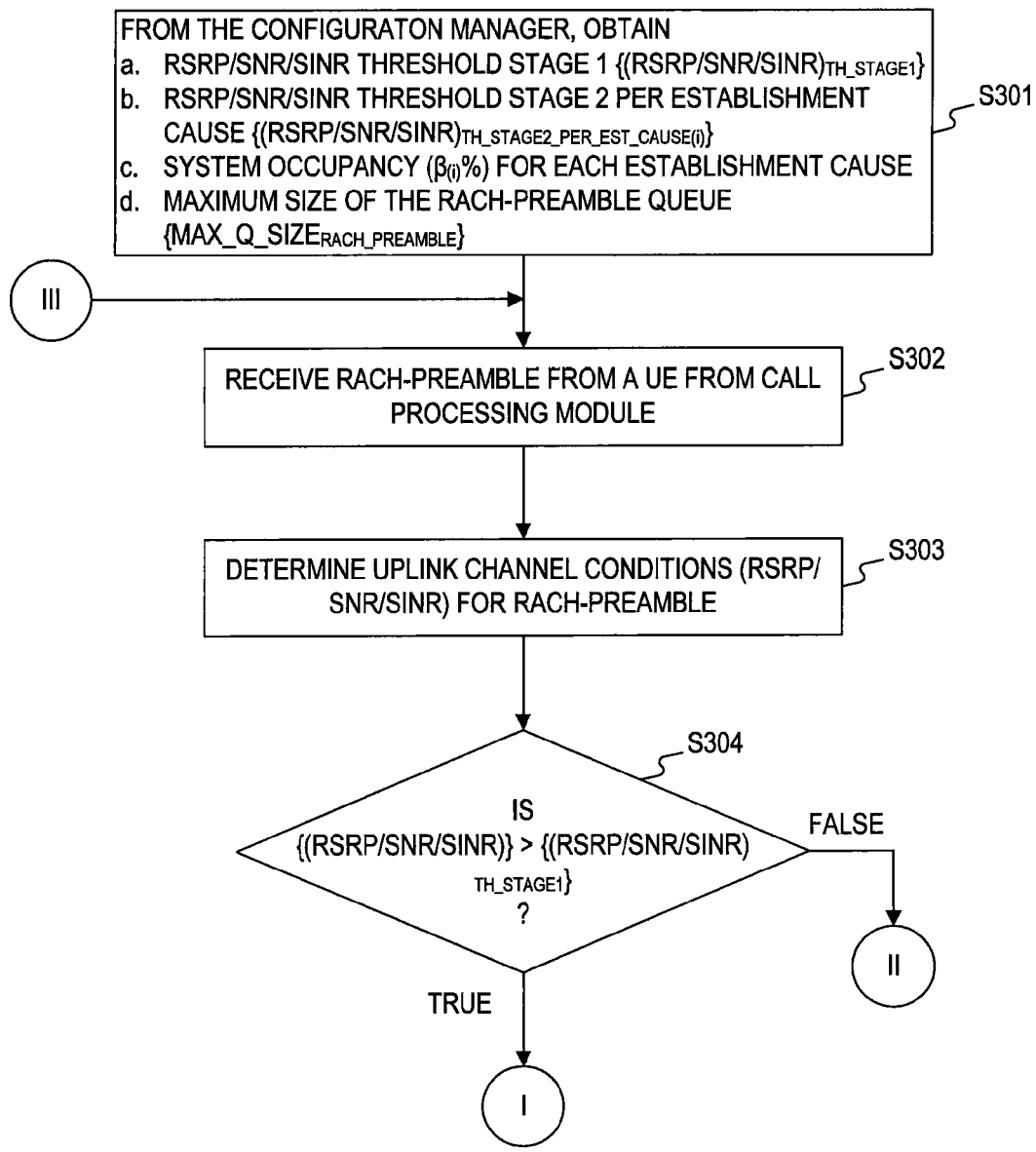
FIG. 3A is an exemplary machine algorithm for initial random access admission control.
Figure 3B:
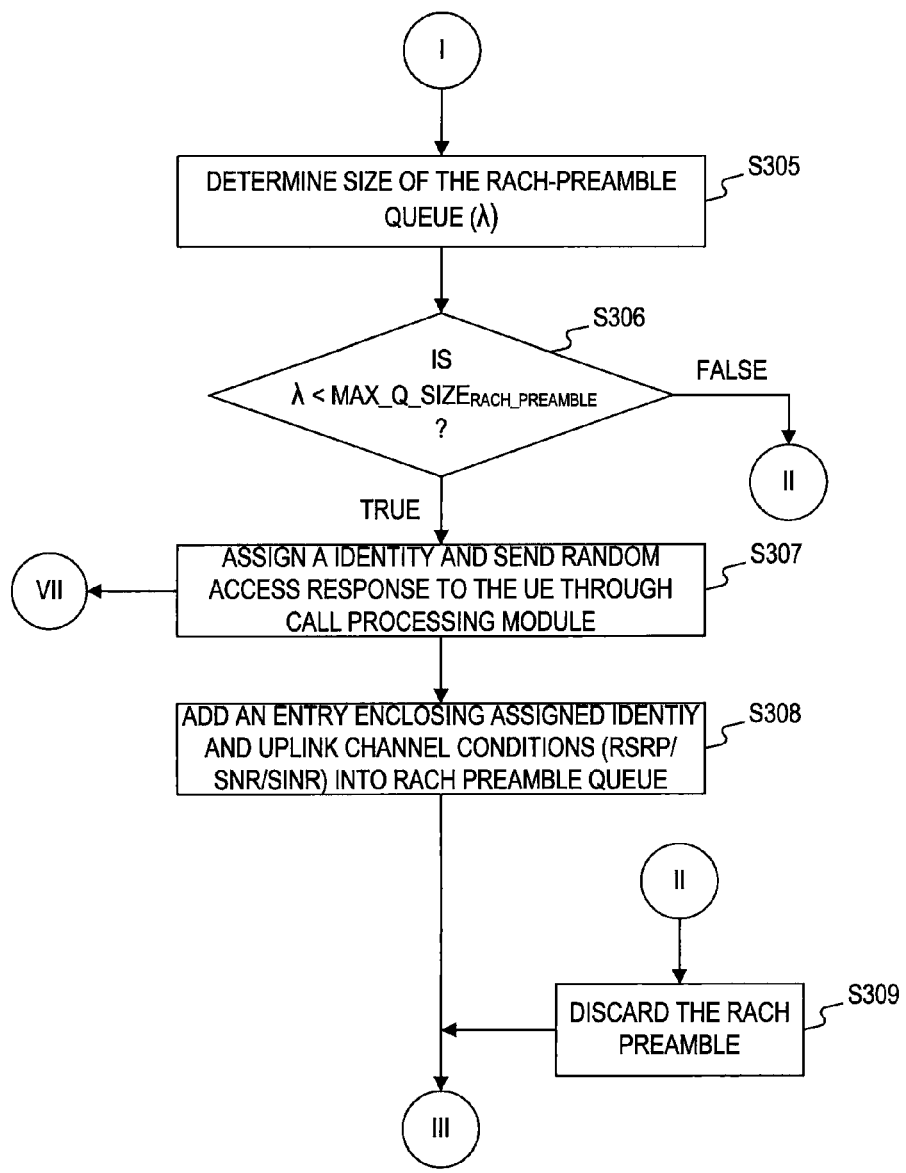
FIG. 3B is a continuation of the machine algorithm of FIG. 3A setting forth additional exemplary steps.
Figure 3C:
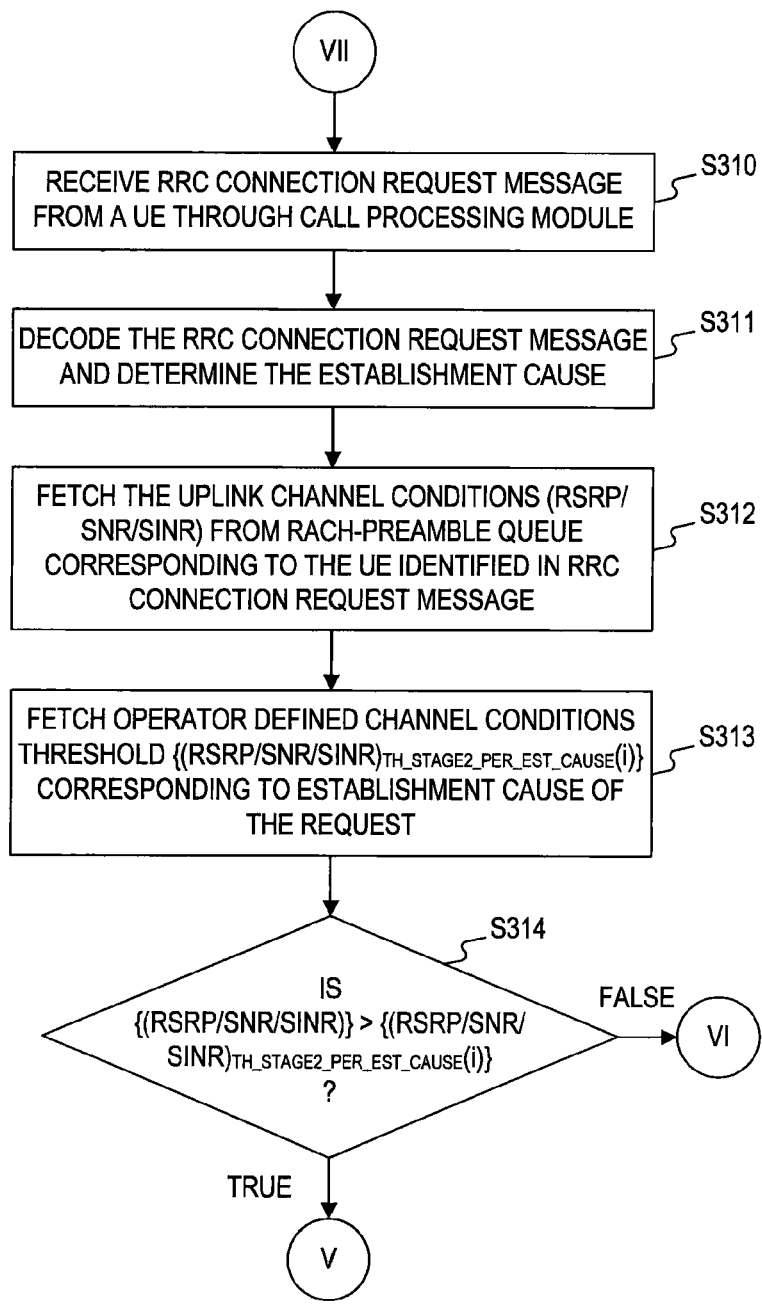
FIG. 3C is a further continuation of the machine algorithm of FIG. 3A setting forth additional exemplary steps.
Figure 3D:
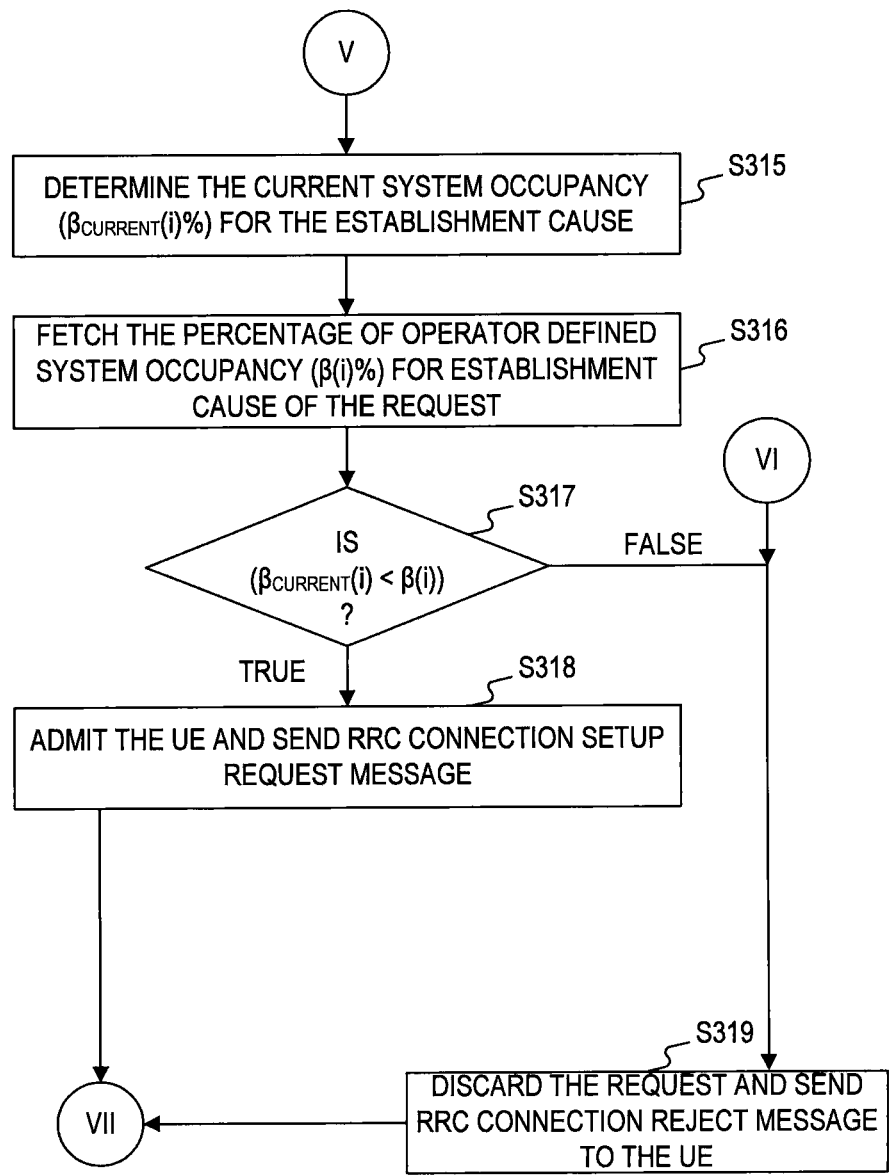
FIG. 3D is an even further continuation of the machine algorithm of FIG. 3A setting forth additional exemplary steps.

As shown in FIG. 2, IRAAC 210 may communicate with a management application module 220 and a call processing application module 230. Exemplarily, IRAAC 210 may provide an intelligent initial random access admission control for admission requests from UE 14 and the bulk of this disclosure will be dedicated to explaining exemplary features of IRAAC 210. The management application module 220 may allow the operator or manager of eNB 11 to specify certain parameters for eNB 11 that are stored in admission control context module 201 of IRAAC 210. The call processing application module 230 may receive signaling packets from UE 14 and after performing a sanity check on the signaling packets, call processing application module 230 may pass on the signaling packets to IRAAC 210 for admission control analysis and pre-emption analysis. The sanity check may involve doing a brief check on the ordering of mandatory parameters and examining the consistency and evenness of the parameter values.

IRAAC 210 may include an admission control context module 201, a control plane protocol filter 202, a stage 1 admission decision and analyzer module 203, a shared data module 204, and a stage 2 admission decision and analyzer module 205. Exemplary embodiments of these modules will be explained in further detail below.

Admission Control Content Module 201

Admission control context module 201 may store parameters that are utilized by other modules of IRAAC 210 to perform admission control. The following parameters may be stored in admission control context module 201.
  a. RSRP/SNR/SINR threshold stage 1 $\{(RSRP/SNR/SINR)_{TH\_STAGE1}\}$;
  b. RSRP/SNR/SINR threshold stage 2 per establishment cause $\{(RSRP/SNR/SINR)_{TH\_STAGE2\_PER\_EST\_CAUSE(i)}\}$;
  c. System Occupancy ($\beta_{(i)}\%$) for each establishment cause; and
  d. Maximum size of the Random Access Channel Preamble ("RACH-Preamble") queue $\{MAX\_Q\_SIZE_{RACH\_PREAMBLE}\}$.

RSRP refers to Reference Signal Received Power, SNR refers to Signal-to-Noise-Ratio, and SINR refers to Signal-to-Interference-Noise-Ratio. $(RSRP/SNR/SINR)_{TH\_STAGE1}$ refers to threshold values for signal characteristics (for example, RSRP, SNR, and SINR) that are utilized by stage 1 admission decision and analyzer module 203.

$(RSRP/SNR/SINR)_{TH\_STAGE2\_PER\_EST\_CAUSE(i)}$ refers to stage 2 threshold RSRP, SNR, and SINR values for each establishment cause and are utilized by stage 2 admission decision and analyzer module 205. An establishment cause is a term that is well known to one of ordinary skill in the art and broadly refers to categories of sessions or calls supported by the eNB. For example, an establishment cause can be one of emergency access, high priority access, mobile terminated access, mobile originated signaling, and mobile originated Data. The stage 2 threshold values may link signal characteristics (RSRP, SINR, SNR) to different establishment causes. This may enable the operator to specify different signal characteristics for different establishment causes because the signal strength requirement is likely to differ between calls from different establishment causes.

System Occupancy ($\beta_{(i)}$%) for each establishment cause refers to a threshold value that defines the maximum number of sessions or calls that can be supported by eNB 11 for a particular establishment cause. For example, eNB 11 may only support 10 emergency access sessions. Accordingly, for emergency access establishment cause, $\beta_{(i)}$% will be 10.

Maximum size of the RACH-Preamble queue {MAX_Q_SIZE$_{RACH\_PREAMBLE}$} refers to a maximum size of the RACH-Preamble queue supported by eNB 11. This parameter signifies an overall or maximum capacity of eNB 11. For example, if MAX_Q_SIZE$_{RACH\_PREAMBLE}$ is 100, eNB 11 may support no more than 100 sessions at any given time.

The above configuration parameters may be set by the operator of eNB 11 through management application module 220. Alternatively, these parameters may be predefined by a manufacturer of eNB 11 or set using any other known method. Many of the above configuration parameters (RSRP/SNR/SINR) are well known to one of ordinary skill in the art as they are defined in the 3GPP standard.

Control Plane Protocol Filter 202

Control plane protocol filter 202 may receive signaling packets from call processing application module 230 and filter the received signaling packet to retrieve RACH-Preambles and Radio Resource Control ("RRC") connection request messages. For example, a UE 14 that wants admission to the network may send signaling packets to eNB 11. Filter 202 may retrieve RACH-Preambles from the signaling packets and provide the retrieved RACH-Preambles to stage 1 admission decision and analyzer module 203. Similarly, filter 202 may retrieve RRC connection request messages from the signaling packets and provide the retrieved RRC connection request messages to module 205.

Stage 1 Admission Decision and Analyzer Module 203

Stage 1 admission decision and analyzer module 203 may implement a first stage of initial random access admission control. For example, stage 1 admission decision and analyzer module 203 may check whether signal characteristics associated with a received RACH-Preamble satisfy predetermined threshold values. Exemplarily, stage 1 admission decision and analyzer module 203 may determine uplink signal characteristics (for example, SNR, SINR, RSRP) associated with the received RACH-Preamble. Stage 1 admission decision and analyzer module 203 may then compare the uplink signal characteristics with corresponding threshold values (for example, (RSRP/SNR/SINR)$_{TH\_STAGE1}$). If the uplink signal characteristics do not exceed the threshold values, stage 1 admission decision and analyzer module 203 may discard the RACH-Preamble and thereby, reject UE 14's admission request.

Stage 1 admission decision and analyzer module 203 may also check whether a maximum capacity of eNB 11 is exceeded by admitting the UE 14 that is requesting admission to eNB 11's network. For example, stage 1 admission decision and analyzer module 203 may check if a current size of the RACH-Preamble queue is less than MAX_Q_SIZE$_{RACH\_PREAMBLE}$ specified in admission control context module admission control context module 201. If a current size of the RACH-Preamble queue is not less than MAX_Q_SIZE$_{RACH\_PREAMBLE}$, stage 1 admission decision and analyzer module 203 may discard the RACH-Preamble and thereby, reject UE 14's admission request.

If both the above checks (signal characteristics exceeding threshold values and eNB capacity not exceeding by admitting UE 14) are successful, stage 1 admission decision and analyzer module 203 may add the RACH-Preamble to the RACH-Preamble queue and store the measured uplink signal characteristics in association with the RACH-Preamble. Exemplarily, module 203 may decode a radio network identifier (RA-RNTI) value included in the received RACH-Preamble. Module 203 may assign a temporary cell radio network identifier (T-CRNTI) value to the UE 14 that sent the RACH-Preamble. The T-CRNTI value may be stored in the RACH-Preamble queue to identify the UE 14 in association with the measured uplink signal characteristics.

In addition to adding the T-CRNTI value of UE 14 to the RACH-Preamble queue, stage 1 admission decision and analyzer module 203 may also transmit a random access response to the UE 14 and include in the random access response the T-CRNTI value. The UE 14 may receive the random access response and utilize the response to prepare and transmit to eNB 11 a RRC connection request. The RRC connection request may be handled by stage 2 admission decision and analyzer module 205 as discussed below.

It will be noted that in some exemplary embodiments, stage 1 admission decision and analyzer module 203 may only implement one of the two checks discussed above prior to sending the random access response. In certain exemplary embodiments, if one of the two checks is satisfied, the UE 14 may be assumed to have cleared stage 1 and stage 1 admission decision and analyzer module 203 may send the random access response to UE 14.

Shared Data Module 204

Shared data module 204 may store data shared by stage 1 admission decision and analyzer module 203 and stage 2 admission decision and analyzer module 205. For example, module 204 may include the RACH-Preamble queue that is shared by modules 203 and 205.

Stage 2 Admission Decision and Analyzer Module 205

Stage 2 admission decision and analyzer module 205 may implement a second stage of initial random access admission control. After stage 1 admission decision and analyzer module 203 sends the random access response to UE 14, UE 14 may transmit a RRC connection request to eNB 11. The RRC connection request may include an establishment cause for the session requested by UE 14. Stage 2 admission decision and analyzer module 205 may decode the RRC connection request to retrieve the establishment cause. Next, module 205 may retrieve the uplink signal characteristics for UE 14 from the RACH-Preamble queue. Module 205 may also retrieve the stage 2 signal characteristic threshold values for the establishment cause of the RRC connection request. That is, module 205 may retrieve (RSRP/SNR/SINR)$_{TH\_STAGE2\_PER\_EST\_CAUSE(i)}$ for the establishment cause and compare these values with the corresponding uplink signal characteristics stored in the RACH-Preamble queue. If the uplink signal characteristics do not exceed the threshold signal characteristic values ((RSRP/SNR/SINR)$_{TH\_STAGE2\_PER\_EST\_CAUSE(i)}$), module 205 may discard the RRC connection request and send a RRC connection reject message to UE 14. It will be noted that in certain exemplary embodiments, the uplink signal characteristics may be measured using the RRC connection request and stage 2 admission decision and analyzer module 205 need not necessarily utilize the uplink signal characteristics stored in the RACH-Preamble queue.

In addition to checking signal characteristic thresholds for the establishment cause, stage 2 admission decision and analyzer module 205 may also check whether the current system occupancy in eNB 11 for the establishment cause specified in UE 14's request is less than the maximum system occupancy for that establishment cause. For example, the operator of eNB 11 may specify that for a particular establishment cause, maximum system occupancy ($\beta_{(i)}\%$) for establishment cause 'i' may not exceed say 10% of eNB 11's total capacity. If a current system occupancy ($\beta_{CURRENT}(i)\%$) is equal to or higher than 10% of eNB 11's total capacity, stage 2 admission decision and analyzer module 205 may discard the RRC connection request. It will be noted that the maximum system occupancy may also be specified in terms of number of sessions permitted for an establishment cause. For example, for establishment cause 'i,' eNB 11 may only allow 10, 15, 30, etc. sessions and this number may denote the maximum system occupancy for establishment cause 'i.'

If the RRC connection request clears both the above checks, stage 2 admission decision and analyzer module 205 may transmit a RRC connection setup request message to UE 14 to enable UE 14 to proceed to other stages of call admission control. For example, when stage 2 admission decision and analyzer module 205 transmits the RRC connection setup request message to UE 14, UE 14 may establish a signaling session with eNB 11 and proceed to UE signaling session admission control at the MME 13 and/or traffic session admission control at eNB 11.

Next, a detailed machine algorithm is presented with reference to FIGS. 3A, 3B, 3C, and 3D for describing exemplary functions of IRAAC 210 for call admission control. In FIGS. 3A-3D, roman numerals I, II, etc. are used to describe the connection between different steps. In S301, admission control context module 201 may retrieve from its configuration manager (not shown) certain threshold parameters. These threshold parameters may be set by an operator of eNB 11 via the management application 220. In other exemplary embodiments, these threshold parameters may be predefined by a manufacturer of eNB 11 or may be set by any other known method. In particular, admission control context module 201 may retrieve one or more of the following parameters:

a. (RSRP/SNR/SINR)$_{TH\_STAGE1}$;
b. (RSRP/SNR/SINR)$_{TH\_STAGE2\_PER\_EST\_CAUSE(i)}$;
c. System Occupancy ($\beta_{(i)}\%$) for each establishment cause; and
d. MAX_Q_SIZE$_{RACH\_PREAMBLE}$.

In S302, stage 1 admission decision and analyzer module 203 may receive a RACH-Preamble from a UE 14. For example, a UE 14 that wants admission to the network may send signaling packets to eNB 11. Filter 202 may retrieve a RACH-Preamble from the signaling packets and provide the retrieved RACH-Preamble to stage 1 admission decision and analyzer module 203. Additionally, in S302, module 203 may decode a radio network identifier (RA-RNTI) value included in the received RACH-Preamble.

In S303, stage 1 admission decision and analyzer module 203 may determine uplink signal characteristics (for example, SNR, SINR, RSRP) associated with the received RACH-Preamble. In S304, stage 1 admission decision and analyzer module 203 may compare the measured uplink signal characteristics with corresponding stage 1 threshold values (for example, (RSRP/SNR/SINR)$_{TH\_STAGE1}$). For example, stage 1 admission decision and analyzer module 203 may compare the measured RSRP with RSRP stage 1 threshold value stored in admission control context module 201. In an exemplary embodiment, each of the three parameters (RSRP, SNR, and SINR) may be compared with their respective threshold values. In another exemplary embodiment, a subset of the parameters may be compared. If the uplink signal characteristics do not exceed the threshold values, stage 1 admission decision and analyzer module 203 may proceed to S309 and discard the RACH-Preamble and thereby, reject UE 14's admission request.

If the uplink signal characteristics are deemed satisfactory in S304, stage 1 admission decision and analyzer module 203 may proceed to S305 to determine a current size ($\lambda$) of the RACH-Preamble queue. In S306, stage 1 admission decision and analyzer module 203 may compare $\lambda$ with MAX_Q_SIZE$_{RACH\_PREAMBLE}$. If $\lambda$ is not less than MAX_Q_SIZE$_{RACH\_PREAMBLE}$, stage 1 admission decision and analyzer module 203 may proceed to S309 and discard the RACH-Preamble and thereby, reject UE 14's admission request. Otherwise, stage 1 admission decision and analyzer module 203 may proceed to S307.

In S307, stage 1 admission decision and analyzer module 203 may assign a temporary cell radio network identifier (T-CRNTI) value to the UE 14 that sent the RACH-Preamble. Additionally, in S307, module 203 may transmit a random access response to the UE 14 through call processing application module 230 and include in the random access response T-CRNTI value assigned to UE 14. In S308, stage 1 admission decision and analyzer module 203 may add the received RACH-Preamble to the RACH-Preamble queue and store the measured uplink signal characteristics in association with the RACH-Preamble. Exemplarily, the assigned T-CRNTI value for UE 14 may be stored in the RACH-Preamble queue in association with the measured uplink signal characteristics. Following S308, control may return to S302 or another intermediate step for processing another RACH-Preamble that may have been received by eNB 11.

The UE 14 may receive the random access response and utilize the response to prepare and transmit a RRC connection request to eNB 11. The RRC connection request may be handled by stage 2 admission decision and analyzer module 205. For example, in S310, stage 2 admission decision and analyzer module 205 may receive the RRC connection request through call processing application module 230. In S311, stage 2 admission decision and analyzer module 205 may decode the RRC connection request to retrieve an establishment cause specified by UE 14 for the requested session. In S312, module 205 may retrieve the uplink signal characteristics for UE 14 from the RACH-Preamble queue. Module 205 may identify UE 14 using an RNTI value included in the RRC connection request, which corresponds to the T-CRNTI value assigned to UE 14 by module 203 and stored in the RACH-Preamble queue.

In S313, module 205 may retrieve the stage 2 signal characteristic threshold values for the establishment cause specified in the RRC connection request. That is, module 205 may retrieve (RSRP/SNR/SINR)$_{TH\_STAGE2\_PER\_EST\_CAUSE(i)}$ for the establishment cause. In S314, module 205 may compare the stage 2 threshold values with the corresponding uplink signal characteristics retrieved from the RACH-Preamble queue. If the uplink signal characteristics do not exceed the threshold signal characteristic values ((RSRP/SNR/SINR)$_{TH\_STAGE2\_PER\_EST\_CAUSE(i)}$), module 205 may proceed to S319 where it may discard the RRC connection request and send a RRC connection reject message to UE 14. It will be noted that in certain exemplary embodiments, the uplink signal characteristics may be measured using the RRC connection request and stage 2 admission decision and analyzer module 205 may not utilize the uplink signal characteristics stored in the RACH-Preamble queue.

In addition to checking signal characteristic thresholds for the establishment cause in S314, stage 2 admission decision and analyzer module 205 may also check whether the current system occupancy in eNB 11 for the establishment cause specified in UE 14's request is less than the maximum system occupancy for that establishment cause. In order to check the system occupancy, module 205 may determine, in S315, the current system occupancy ($\beta_{CURRENT}(i)$ %) for the specified establishment cause (where T denotes the specified establishment cause). The current system occupancy may specify, for example, number of existing sessions in eNB 11 with establishment cause 'i.' Next, in S316, module stage 2 admission decision and analyzer module 205 may retrieve the maximum system occupancy ($\beta_{(i)}$%) from admission control context module 201. In S317, module 205 may compare $\beta_{(i)}$% with $\beta_{CURRENT}(i)$ %. If $\beta_{CURRENT}(i)$ % is not less than $\beta_{(i)}$%, module 205 may proceed to step 319 and discard the RRC connection request and send RRC connection reject message to UE 14. Otherwise, module 205 may transmit, in S318, a RRC connection setup request message to UE 14 to enable UE 14 to proceed to other stages of call admission control. For example, when stage 2 admission decision and analyzer module 205 transmits the RRC connection setup request message to UE 14, UE 14 may establish a signaling session with eNB 11 and proceed to UE signaling session admission control at the MME 13 and/or traffic session admission control at eNB 11. Following these steps, control may return to S310 or another intermediate step for processing a new RRC connection request message.

While an exemplary machine algorithm has been described with reference to FIGS. 3A, 3B, 3C, and 3D, it will be understood that certain exemplary embodiments may change the order of steps in the machine algorithm or may even eliminate or modify certain steps. For example, an exemplary embodiment may execute S305 and S306 before S302, S303, and S304. In another exemplary embodiment, these steps may be executed in parallel. In yet another exemplary embodiment, S315, S316, and S317 may be executed prior to or in parallel with S312, S313, and S314. In yet another exemplary embodiment, S304 may be eliminated such that control directly proceeds from S303 to S305. In another exemplary embodiment, S305 and S306 may be eliminated such that control directly proceeds from S304 to S307. In yet another embodiment, only one of the system occupancy and signal characteristic checks may be executed by stage 2 admission decision and analyzer module 205. Other variations to the exemplary machine algorithm set forth in FIGS. 3A-3D will be apparent to a skilled artisan.

The different components of IRAAC 15 (FIG. 2) may be embodied in hardware or software or a combination of both. The hardware may include a general-purpose computer having a central processing unit (CPU) and memory/storage devices that store data and various programs such as an operating system and one or more application programs. Furthermore, each of the steps in the machine algorithms described in FIGS. 3A-3D may be embodied as computer-readable instructions or code and stored in a non-transitory computer-readable storage medium for execution by a computer.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

What is claimed is:

1. A method of implementing admission control in a wireless network, the method comprising:
   receiving a Random Access Channel Preamble (RACH-Preamble) from a mobile device;
   determining whether signal characteristics associated with the RACH-Preamble exceed predetermined threshold values;
   transmitting a first response to the mobile device when the signal characteristics associated with the RACH-Preamble exceed predetermined threshold values;
   receiving a Radio Resource Control (RRC) connection request from the mobile device after transmitting the first response;
   determining an establishment cause of the RRC connection request;
   determining whether the signal characteristics associated with the RRC connection request exceed predetermined threshold signal characteristics associated with the establishment cause; and
   processing the RRC connection request based on determining whether signal characteristics associated with the RRC connection request exceed predetermined threshold signal characteristics.

2. The method of claim 1 further comprising confirming that base station capacity is not exceeded by adding the RACH-Preamble to a RACH-Preamble queue before transmitting the first response.

3. The method of claim 1, wherein the signal characteristics include at least one of a reference signal received power, signal-to-noise ratio, and signal-to interference-noise-ratio.

4. The method of claim 2, wherein the base station capacity is determined to be exceeded when a current size of the RACH-preamble queue is not less than a predetermined maximum size of the RACH-preamble queue.

5. The method of claim 1 further comprising:
   retrieving predetermined threshold signal characteristics for the establishment cause;
   retrieving a current system occupancy for the establishment cause; and
   retrieving a predetermined maximum system occupancy for the establishment cause.

6. The method of claim 5, wherein processing the RRC connection request comprises rejecting the RRC connection request when:
   signal characteristics associated with the RACH-Preamble or the RRC connection request exceed the predetermined threshold signal characteristics for the establishment cause; and
   the current system occupancy for the establishment cause is less than the predetermined maximum system occupancy for the establishment cause.

7. The method of claim 6, wherein the signal characteristics include at least one of a reference signal received power, signal-to-noise ratio, and signal-to-interference-noise-ratio.

8. A system for implementing admission control in a wireless network, the system comprising:
   a hardware processor; and
   a memory storing instructions for execution by the hardware processor, wherein the hardware processor is configured by the instructions to:
   receive a Random Access Channel Preamble (RACH-Preamble) from a mobile device;

determine whether signal characteristics associated with the RACH-Preamble exceed predetermined threshold values;

transmit a first response to the mobile device when the signal characteristics associated with the RACH-Preamble exceed predetermined threshold values;

receive a Radio Resource Control (RRC) connection request from the mobile device after transmitting the first response;

determine an establishment cause of the RRC connection request;

determine whether signal characteristics associated with the RRC connection request exceed predetermined threshold signal characteristics associated with the establishment cause; and process the RRC connection request based on determining whether signal characteristics associated with the RRC connection request exceed predetermined threshold signal characteristics.

9. The system of claim 8, wherein the hardware processor is configured to confirm that base station capacity is not exceeded by adding the RACH-Preamble to a RACH-Preamble queue before transmitting the first response.

10. The system of claim 9, wherein the base station capacity is determined to be exceeded when a current size of the RACH-preamble queue is not less than a predetermined maximum size of the RACH-preamble queue.

11. The system of claim 8, wherein the signal characteristics include at least one of a reference signal received power, signal-to-noise ratio, and signal-to-interference-noise-ratio.

12. The system of claim 8, wherein the hardware processor is further configured to:

retrieve predetermined threshold signal characteristics for the establishment cause;

retrieve a current system occupancy for the establishment cause; and retrieve a predetermined maximum system occupancy for the establishment cause.

13. The system of claim 12, wherein the hardware processor is configured to reject the RRC connection request when:

signal characteristics associated with the RACH-Preamble or the RRC connection request exceed the predetermined threshold signal characteristics for the establishment cause; and the current system occupancy for the establishment cause is less than the predetermined maximum system occupancy for the establishment cause.

14. The system of claim 13, wherein the signal characteristics include at least one of a reference signal received power, signal-to-noise ratio, and signal-to-interference-noise-ratio.

15. A non-transitory computer-readable storage medium storing instructions which when executed by a processor enable the processor to execute a method of implementing admission control in a wireless network, the method comprising:

receiving a Random Access Channel Preamble (RACH-Preamble) from a mobile device;

determining whether signal characteristics associated with the RACH-Preamble exceed predetermined threshold values;

transmitting a first response to the mobile device when the signal characteristics associated with the RACH-Preamble exceed predetermined threshold values;

receiving a Radio Resource Control (RRC) connection request from the mobile device after transmitting the first response;

determining an establishment cause of the RRC connection request;

determining whether signal characteristics associated with the RRC connection request exceed predetermined threshold signal characteristics associated with the establishment cause; and processing the RRC connection request based on determining whether the signal characteristics associated with the RRC connection request exceed predetermined threshold signal characteristics.

16. The non-transitory computer-readable storage medium of claim 15, further comprising confirming that base station capacity is not exceeded by adding the RACH-Preamble to a RACH-Preamble queue before transmitting the first response.

17. The non-transitory computer-readable storage medium of claim 15, wherein the signal characteristics include at least one of a reference signal received power, signal-to-noise ratio, and signal-to-interference-noise-ratio.

18. The non-transitory computer-readable storage medium of claim 15, further comprising:

retrieving predetermined threshold signal characteristics for the establishment cause;

retrieving a current system occupancy for the establishment cause; and retrieving a predetermined maximum system occupancy for the establishment cause.

19. The non-transitory computer-readable storage medium of claim 18, wherein processing the RRC connection request comprises rejecting the RRC connection request when:

signal characteristics associated with the RACH-Preamble or the RRC connection request exceed the predetermined threshold signal characteristics for the establishment cause; and the current system occupancy for the establishment cause is less than the predetermined maximum system occupancy for the establishment cause.

* * * * *